United States Patent
Kanai et al.

(10) Patent No.: US 6,538,812 B1
(45) Date of Patent: *Mar. 25, 2003

(54) TELESCOPE AND BINOCULARS

(75) Inventors: Moriyasu Kanai, Saitama (JP); Satoru Nemoto, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,805

(22) Filed: Dec. 17, 2001

Related U.S. Application Data

(62) Division of application No. 09/697,173, filed on Oct. 27, 2000, now Pat. No. 6,384,969.

(30) Foreign Application Priority Data

Oct. 28, 1999 (JP) .......................................... 11-306447
Oct. 28, 1999 (JP) .......................................... 11-306448

(51) Int. Cl.⁷ .............................................. G02B 23/00
(52) U.S. Cl. ........................ 359/431; 359/399; 359/407
(58) Field of Search ................................ 359/362–363, 359/399–412, 431, 480–482, 831–837; 396/373–386

(56) References Cited

U.S. PATENT DOCUMENTS

| | | | |
|---|---|---|---|
| 1,302,351 A | 4/1919 | Fouasse | 359/835 |
| 3,051,046 A | 8/1962 | Thompson | 359/407 |
| 4,383,741 A | 5/1983 | Vogel et al. | 359/407 |
| 4,826,302 A | 5/1989 | Afsenius | 359/407 |
| 4,947,198 A | 8/1990 | Inanobe et al. | 396/373 |
| 5,091,739 A | 2/1992 | Kawamura | 396/383 |
| 5,282,082 A | 1/1994 | Espie et al. | 359/409 |
| 5,589,978 A | 12/1996 | Fantone | 359/407 |
| 5,822,114 A | 10/1998 | Hanzawa | 359/380 |
| 6,157,483 A | * 12/2000 | Watanabe | 359/431 |
| 6,384,969 B1 | * 5/2002 | Kanai et al. | 359/431 |

FOREIGN PATENT DOCUMENTS

JP      3037271      2/1997

* cited by examiner

*Primary Examiner*—Thong Nguyen
(74) *Attorney, Agent, or Firm*—Greenblum & Bernstein, P.L.C.

(57) ABSTRACT

A telescope includes an erecting system having first, second, third and fourth reflecting surfaces from an object side, the first and second reflecting surfaces and the third and fourth reflecting surfaces facing each other at right angle, respectively. An objective lens located between the first and fourth reflecting surfaces has a positive refractive power to converge object light that is reflected by at least the first reflecting surface for forming an image. An eyepiece located between the fourth reflecting surface and an eye point, has a positive refractive power to magnify the image formed by the objective lens. The first reflecting surface is formed on a retractable mirror that can swing between a working position such that the first and second reflecting surfaces are perpendicular, and a retracted position such that a free end of the retractable mirror moves close to the second reflecting surface.

8 Claims, 7 Drawing Sheets

TELESCOPE AND BINOCULARS

CROSS-REFERENCE TO RELATED APPLICATION

This application is application is a division of U.S. patent application No. 09/697,173, filed on Oct. 27, 2000 now U.S. Pat. No. 6,384,969, the contents of which are incorporated herein by reference in their entireties.

BACKGROUND OF THE INVENTION

The present invention relates to a visual optical device such as a telescope or binoculars that has an objective lens, an erecting system and eyepiece.

A visual optical device that includes an objective lens having a positive refractive power and an eyepiece having a positive refractive power requires an erecting system that erects an inverted real image formed by the objective lens when the device is used for a terrestrial observation.

Therefore, a visual optical device has the erecting system such as a pentagonal roof prism or Porro prisms located between the objective lens and the eyepiece. An inverted real image formed by the objective lens is erected by the erecting system, and then the eyepiece magnifies the erected real image for an observation by a naked eye.

Since manufacturing of roof surfaces of a pentagonal roof prism requires very high processing accuracy, a manufacturing cost becomes higher, which raises the total cost of the visual optical device. Therefore, the Porro prism erecting system is preferable to be used in the visual optical device.

FIG. 11 is a developed diagram of an optical system of a conventional visual optical device. The optical system 100 of this device consists of an objective lens 110, an erecting system 130 and an eyepiece 120, arranged in this order from an object side.

The erecting system 130 is a Porro prism erecting system that is provided with a first Porro prism and a second Porro prism. Each of the Porro prisms is a 45-90-45° reflecting prism whose reflecting surfaces form a right angle for reflecting the light beam through a total angle of 180°. The four reflecting surfaces of the Porro prism erecting system can be replaced with mirrors. In the specification, a Porro type erecting system means both of the Porro prism erecting system and the combination of alternative mirrors.

It should be noted that the first and second Porro prisms are shown as boxes 131 and 132 illustrated by dotted lines in FIG. 11. The boxes 131 and 132 represent spaces occupied by the first and second Porro prisms, respectively.

Object light incident on the optical system 100 from the left-hand side in FIG. 11 is converged by the objective lens 110 to form a real image of an object. Since the light is reflected by four times through the first and second Porro prisms, an erected real image is formed on a field stop 140. The eyepiece 120 magnifies the erected real image.

The maximum incident angle ω is determined by the following equation:

$$\omega = \tan^{-1}(y/f_o)$$

where y is a radius of aperture of the field stop 140 and $f_o$ is a focal length of the objective lens 110. A real field of view is twice the maximum incident angle, i.e., 2ω.

Since observing region becomes broader as the real field of view 2ω increases, it is preferable to increase the real field of view. The equation teaches two ways to increase the real field of view 2ω. A first way is to decrease the focal length $f_o$ of the objective lens 110. A second way is to increase the radius of aperture y of the field stop 140.

However, if the focal length $f_o$ of the objective lens 110 becomes shorter without changing the radius of aperture y, the distance between the objective lens 110 and the field stop 140 becomes too short to locate the erecting system 130, as shown in FIG. 12.

On the other hand, if the radius of aperture y of the field stop 140 becomes larger without changing the space for the erecting system 130, the diameter of the eyepiece must be large as shown in FIG. 13. The erecting system 130 also becomes larger, which increases the total size of the device.

SUMMARY OF THE INVENTION

It is therefore an object of the present invention to provide a visual optical device such as a telescope and binoculars capable of increasing the real field of view with employing a Porro type erecting system and keeping a compact total size.

For the above object, according to the present invention, there is provided an improved telescope, which includes a Porro type erecting system having first, second, third and fourth reflecting surfaces that are arranged from an object side, an objective lens that is located between the second and third reflecting surfaces, and an eyepiece that is located between the fourth reflecting surface and an eye point. The eye point means a position of an exit pupil of the telescope.

The first and second reflecting surfaces and the third and fourth reflecting surfaces are faced to each other at a right angle, respectively. Further, an intersection line between extended surfaces of the first and second reflecting surfaces is perpendicular to an intersection line between extended surfaces of the third and fourth reflecting surfaces at twisted positions. The objective lens has a positive refractive power to converge object light that is reflected by the first and second reflecting surfaces for forming an image and the eyepiece has a positive refractive power to magnify the image formed by the objective lens.

With this construction, since the objective lens is located between the second and third reflecting surfaces, the distance between the objective lens and a field stop can be shorter than the conventional optical system, which enables to decrease the focal length of the objective lens without narrowing the space for the erecting system. Therefore, a real field of view can be larger with employing the Porro type erecting system and keeping a compact total size.

The first and second reflecting surfaces may be formed on separate mirrors or formed as back-surfaces of a right-angle prism. When the first and second reflecting surfaces are formed as back-surfaces of the same prism, adjustment between these reflecting surfaces becomes unnecessary, which eases the assembling of the reflecting surfaces onto the telescope.

In the same manner, the third and fourth reflecting surfaces may be formed on separate mirrors or formed as back-surfaces of a right-angle prism. If the first and second reflecting surfaces, and the third and fourth reflecting surfaces are formed as right angle prisms, respectively, these reflecting surfaces constitute a type I Porro prism erecting system.

According to an another aspect of the present invention, there is provided a telescope, which includes: a Porro type erecting system whose first reflecting surface is formed on a retractable mirror that can swing between a working position where the first and second reflecting surfaces are perpendicular and a retracted position where the free end of the retractable mirror moves close to the second reflecting surface, an objective lens that is located between the first reflecting surface and the fourth reflecting surface, and an eyepiece that is located between the fourth reflecting surface and an eye point.

With this construction, since the objective lens is located between the first reflecting surface and the fourth reflecting surface, the optical system of the telescope becomes thinner when the retractable mirror is in the retracted position.

Further, an angle adjusting mechanism may be added to the retracting mechanism for the retractable mirror in order to finely adjust the direction of the object light reflected by the retractable mirror. It is preferable that an incident optical axis, which is an optical axis of the objective lens bent by the reflecting surfaces between the object and the objective lens, are parallel to an exit optical axis, which is an optical axis of the eyepiece extended toward the eye point.

Binoculars of the invention is provided with the above described telescopes in a pair. Each of the telescopes includes the Porro type erecting system, the objective lens located between the second and third reflecting surfaces, and an eyepiece located between the fourth reflecting surface and an eye point.

The first reflecting surfaces of the pair of telescopes may be formed on a common mirror. Further, the first reflecting surfaces may be formed on the retractable mirrors. In the specific case, the first reflecting surfaces are formed on a common retractable mirror.

The second reflecting surfaces are preferably adjacent to each other in the same plane. Further, the second reflecting surfaces may be formed on a common mirror.

DESCRIPTION OF THE ACCOMPANYING DRAWINGS

DESCRIPTION OF THE EMBODIMENTS

First Embodiment

Figure 1:
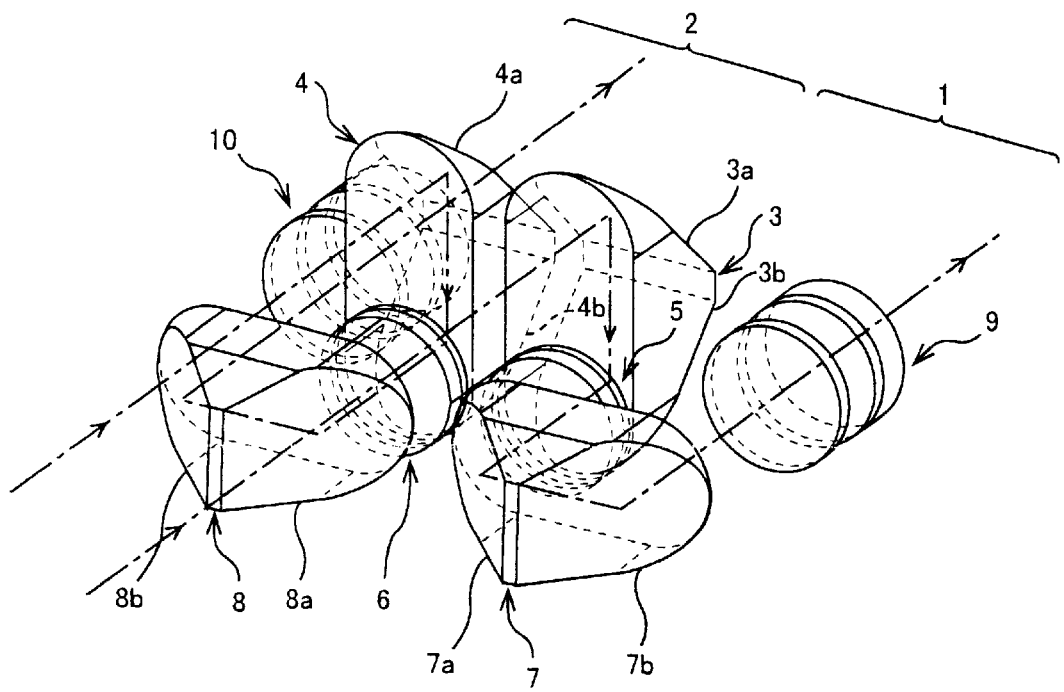
FIG. 1 is a perspective view of an optical system showing arrangement of optical elements of binoculars according to a first embodiment.

FIG. 1 shows an optical system of binoculars according to a first embodiment of the invention. The binoculars is provided with a pair of telescopes 1 and 2 arranged side by side for respective eyes of a user.

The binoculars has the Keplerian telescopes 1 and 2 that consist of objective lenses 5, 6 to form inverted real images and eyepieces 9, 10 to magnify the real images, and Porro prism erecting systems that erect the inverted real images formed by the objective lenses 5, 6. The Porro prism erecting systems have first Porro prisms 3, 4 and second Porro prisms 7, 8.

Each of the objective lenses 5, 6 and the eyepieces 9, 10 may be a single lens or a combination of a plurality of lens groups. In any way, the objective lenses 5, 6 and the eyepieces 9, 10 have positive refractive power, respectively.

The eyepieces 9 and 10 of the telescopes 1 and 2 are arranged such that the optical axes thereof are separated in parallel. The distance between the optical axes of the eyepieces 9 and 10 is substantially equal to an average interpupillary distance. In the following description, a plane in which the optical axes of the eyepieces are located is referred to as a horizontal plane, a direction perpendicular to the horizontal plane is referred to as a vertical direction, and a direction perpendicular to the optical axes of the eyepieces in the horizontal plane is referred to as a horizontal direction.

The erecting system has first, second, third and fourth reflecting surfaces that are arranged from an object side. The first and second reflecting surfaces and the third and fourth reflecting surfaces are faced to each other at a right angle, respectively. In the first embodiment, the reflecting surfaces are back-surfaces of the prisms. That is, the back-surfaces of the first Porro prisms 3 and 4 are the first reflecting surfaces 3a, 4a and the second reflecting surfaces 3b, 4b, the back-surfaces of the second Porro prisms 7 and 8 are the third reflecting surfaces 7a, 8a and the fourth reflecting surfaces 7b, 8b.

Each of the first and second Porro prisms 3, 4, 7 and 8 is a 45-90-45° reflecting prism whose two reflecting surfaces form a right angle for reflecting the light beam through a total angle of 180°. The corners of the prism are rounded to minimize breakage and simplify assembly. The first and second Porro prisms 3, 4 and 7, 8 are arranged as type I Porro prism erecting systems. Namely, an intersection line between extended surfaces of the reflecting surfaces 3a, 3b of the first Porro prism 3 is perpendicular to an intersection line between extended surfaces of the reflecting surfaces 7a, 7b of the second Porro prism 7 at twisted positions. In the same manner, an intersection line between extended surfaces of the reflecting surfaces 4a, 4b of the first Porro prism 4 is perpendicular to an intersection line between extended surfaces of the reflecting surfaces 8a, 8b of the second Porro prism 8 at twisted positions.

The second Porro prisms 7 and 8 are arranged such that the third and fourth reflecting surfaces 7a, 8a and 7b, 8b are perpendicular to the horizontal plane. The eyepieces 9 and 10 are located between the fourth reflecting surfaces 7b, 8b and eye points. The optical axes of the eyepieces 9 and 10 intersect the centers of the fourth reflecting surfaces 7b and 8b at 45° and are bent by a right angle toward the third reflecting surfaces 7a and 8a. The optical axes bent by the fourth reflecting surfaces 7b and 8b are again bent by the third reflecting surfaces 7a and 8a at a right angle in the horizontal plane. Therefore, the optical axes of the eyepieces 9 and 10 are bent by 180° in the horizontal plane.

The objective lenses 5 and 6 are located between the second reflecting surfaces 3b, 4b and the third reflecting surfaces 7a, 8a, i.e., between the first Porro prisms 3, 4 and the second Porro prisms 7, 8. The optical axes of the objective lenses 5 and 6 are coincident with the optical axes of the eyepieces 9 and 10 bent by 180° by the second Porro prisms 7 and 8.

Here, planes in which the optical axes of the respective objective lenses 5, 6 are located and are perpendicular to the horizontal plane are referred to as vertical planes.

The first Porro prisms 3 and 4 are arranged such that the first reflecting surfaces 3a, 4a and the second reflecting surfaces 3b, 4b are perpendicular to the vertical planes, respectively. The optical axes of the objective lenses 5 and 6 intersect the centers of the second reflecting surfaces 3b and 4b at 45° and are bent by a right angle toward the first reflecting surfaces 3a and 4a. The optical axes bent by the second reflecting surfaces 3b and 4b are again bent by the first reflecting surfaces 3a and 4a at a right angle in the respective vertical planes. Therefore, the optical axes of the objective lenses 5 and 6 are bent by 180° in the respective vertical planes by the first Porro prisms 3 and 4.

With above described arrangement, incident optical axes, which are the optical axes of the objective lenses 5 and 6 bent by 180° by the first Porro prisms 3 and 4, are parallel to exit optical axes, which are the optical axes of the eyepieces 9 and 10 extended toward the eye points.

Object light rays incident on the first Porro prisms 3 and 4 are reflected by the first reflecting surfaces 3a, 4a and the second reflecting surfaces 3b, 4b in succession, and then the object light rays are incident on the respective objective lenses 5 and 6. Images formed by the objective lenses 5 and 6 are inverted real images. However, since the first Porro prisms 3 and 4 invert the orientations of the object light rays in the vertical direction, and the second Porro prisms 7 and 8 invert the orientations of the object light rays in the horizontal direction, the erected images can be observed through the eyepieces 9 and 10.

In the first embodiment, since the objective lenses 5 and 6 are located between the second reflecting surfaces 3b, 4b and the third reflecting surfaces 7a, 8a, the distance between the objective lenses 5, 6 and field stops can be shorter than the conventional optical system, which enables to decrease the focal lengths of the objective lenses 5 and 6 without narrowing the space for the erecting systems. Therefore, the binoculars of the first embodiment can increase the real field of view with employing the Porro type erecting system and keeping a compact total size.

Second Embodiment

Figure 2:
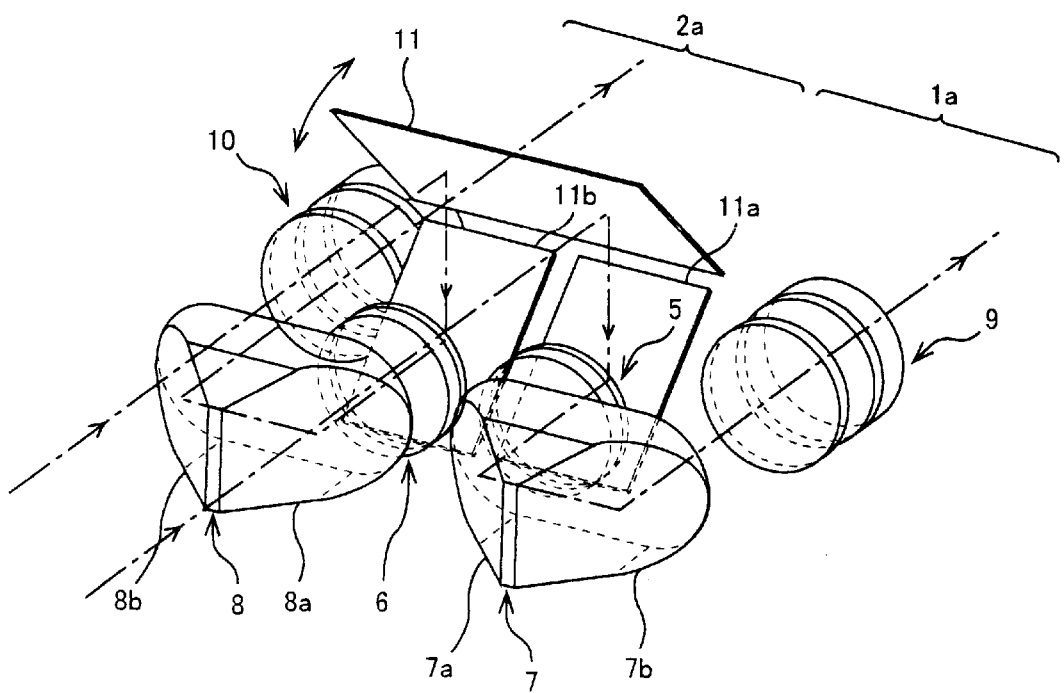
FIG. 2 is a perspective view of an optical system showing arrangement of optical elements of binoculars according to a second embodiment.
Figure 3:
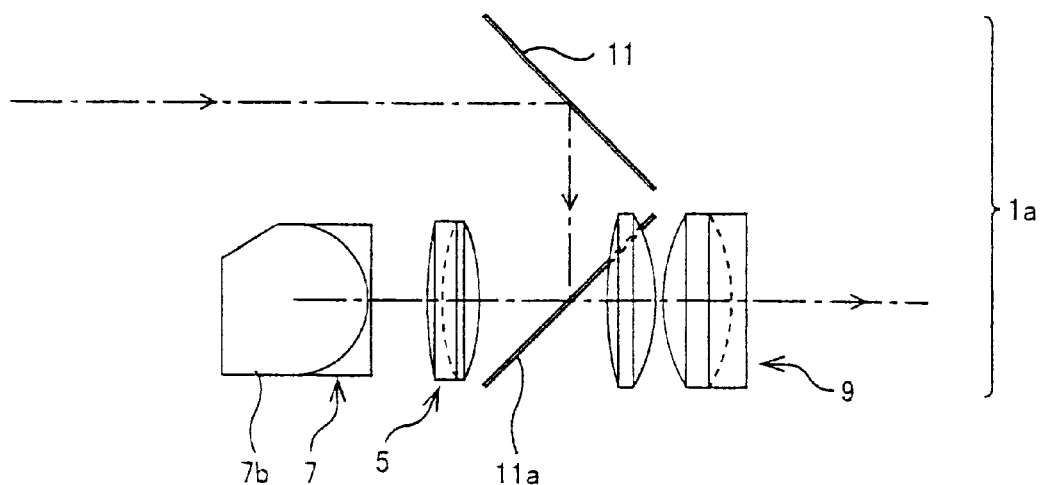
FIG. 3 is a side view of the optical system of FIG. 2 when a retractable mirror is in a working position.
Figure 4:
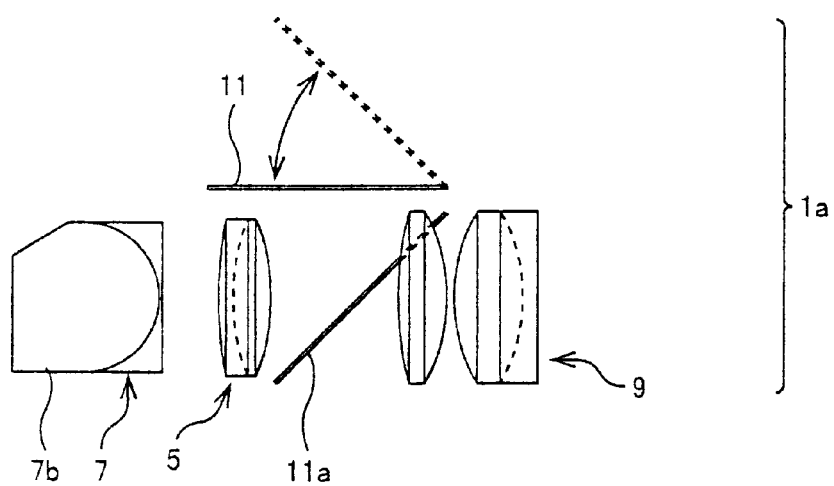
FIG. 4 is a side view of the optical system of FIG. 2 when a retractable mirror is in a retracted position.

FIGS. 2 through 4 show binoculars according to a second embodiment. The difference of the second embodiment from the first embodiment is to employ mirrors 11, 11a and 11b instead of the first Porro prisms 3 and 4. The other constructions are common to the first embodiment.

The binoculars of the second embodiment has a pair of telescopes 1a and 2a that consist of objective lenses 5, 6, eyepieces 9, 10 and Porro type erecting systems that have a retractable mirror 11, a pair of second mirrors 11a, 11b and Porro prisms 7, 8. The second mirrors 11a and 11b are located at the same positions of the second reflecting surfaces 3b and 4b of the first embodiment, and are adjacent to each other in the same plane.

As described above, the Porro type erecting system has first, second, third and fourth reflecting surfaces. In the second embodiment, the retractable mirror 11 is a common first reflecting surface to both of the telescopes 1a and 1b, the second mirrors 11a, 11b act as the second reflecting surfaces.

Further, the retractable mirror 11 can swing between a working position where the first and second reflecting surfaces are perpendicular and a retracted position where the free end of the retractable mirror 11 moves close to the second mirrors 11a and 11b. That is, the retractable mirror 11 is supported by a casing (not shown) on a hinge (not shown) at the side of the second mirrors 11a and 11b.

FIG. 3 is a side view of the binoculars of the second embodiment when the retractable mirror 11 is in the working position. In the working position, the reflecting surface of the retractable mirror 11 and the reflecting surfaces of the second mirrors 11a and 11b are perpendicular to each other. The optical function of the second embodiment is the same as the first embodiment. That is, the object light rays are reflected by the retractable mirror 11 and the second mirrors 11a, 11b, and then converged by the objective lenses 5 and 6 to form real images. The object light rays through the objective lenses 5 and 6 are then reflected by the Porro prisms 7 and 8, and are magnified through the eyepieces 9 and 10.

When the retractable mirror 11 swings to the retracted position as shown in FIG. 4, the retractable mirror 11 is parallel to the horizontal plane, i.e., the retractable mirror 11 forms 45° with respect to the second mirrors 11a and 11b.

Since the objective lenses 5 and 6 are located between the second mirrors 11a, 11b and the Porro prisms 7, 8, the optical system of the binoculars becomes thinner in the vertical direction when the retractable mirror 11 is in the retracted position. This is convenient to store the binoculars into a bag and/or to carry the binoculars.

Further, when the first reflecting surfaces of the erecting system is retractable, it is preferable that the first reflecting surfaces of both telescopes are formed as a common retractable mirror as described in the second embodiment. If independent retractable mirrors are provided in the telescopes, mechanical error of the retractable mechanisms may cause difference in the directions of the incident optical axes between the right and left telescopes. When the common retractable mirror is provided, the mechanical error does not cause the difference in the directions of the incident optical axes.

Third Embodiment

Figure 5:
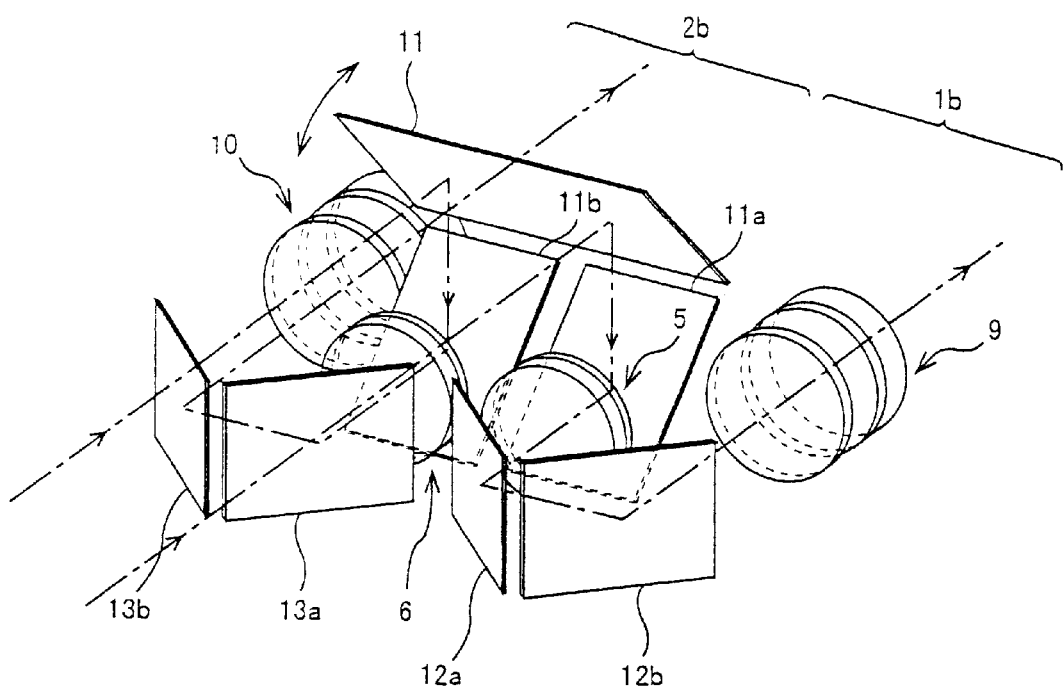
FIG. 5 is a perspective view of an optical system showing arrangement of optical elements of binoculars according to a third embodiment.
Figure 6:
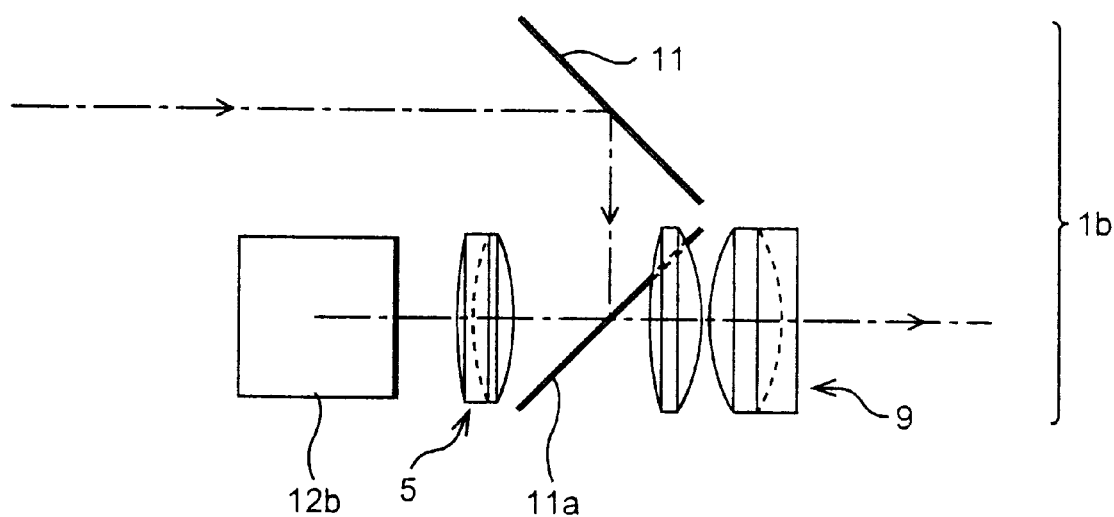
FIG. 6 is a side view of the optical system of FIG. 5 when a retractable mirror is in the working position.
Figure 7:
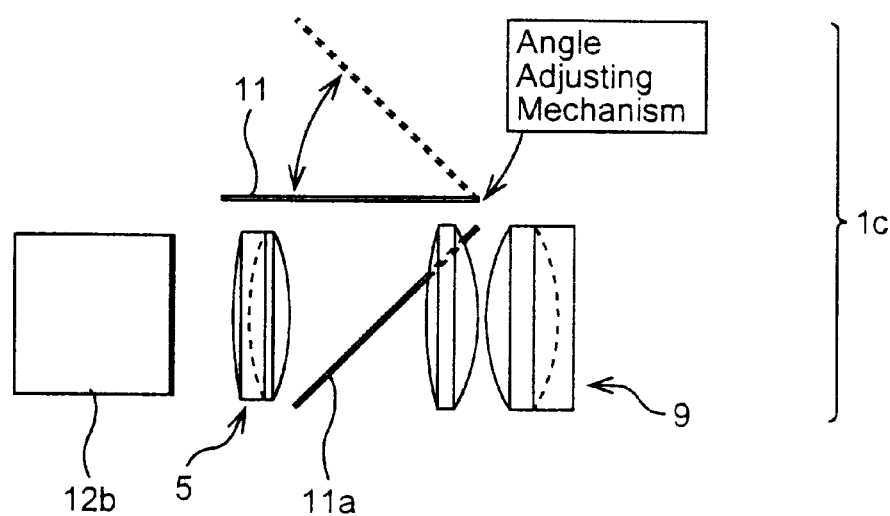
FIG. 7 is a side view of the optical system of FIG. 5 when a retractable mirror is in the retracted position.

FIGS. 5 through 7 show binoculars according to a third embodiment. The difference of the third embodiment from the second embodiment is to employ mirrors 12a, 12b, 13a and 13b instead of the Porro prisms 7 and 8. The other constructions are common to the second embodiment.

The binoculars of the third embodiment has a pair of telescopes 1b and 2b that consist of objective lenses 5, 6, eyepieces 9, 10 and Porro type erecting systems that have a retractable mirror 11, a pair of second mirrors 11a, 11b, a pair of third mirrors 12a, 13a and a pair of fourth mirrors 12b, 13b. The third mirrors 12a and 13a are located at the same positions of the third reflecting surfaces 7a and 8a in the second embodiment, and the fourth mirrors 12b and 13b are located at the same positions of the fourth reflecting surfaces 7b and 8b in the second embodiment.

FIG. 6 is a side view of the binoculars of the third embodiment when the retractable mirror 11 is in the working position. When the retractable mirror 11 swings to the retracted position as shown in FIG. 7, the retractable mirror 11 is parallel to the horizontal plane. The binocular of the third embodiment is also convenient to store it into a bag and/or to carry it.

Fourth Embodiment

Figure 8:
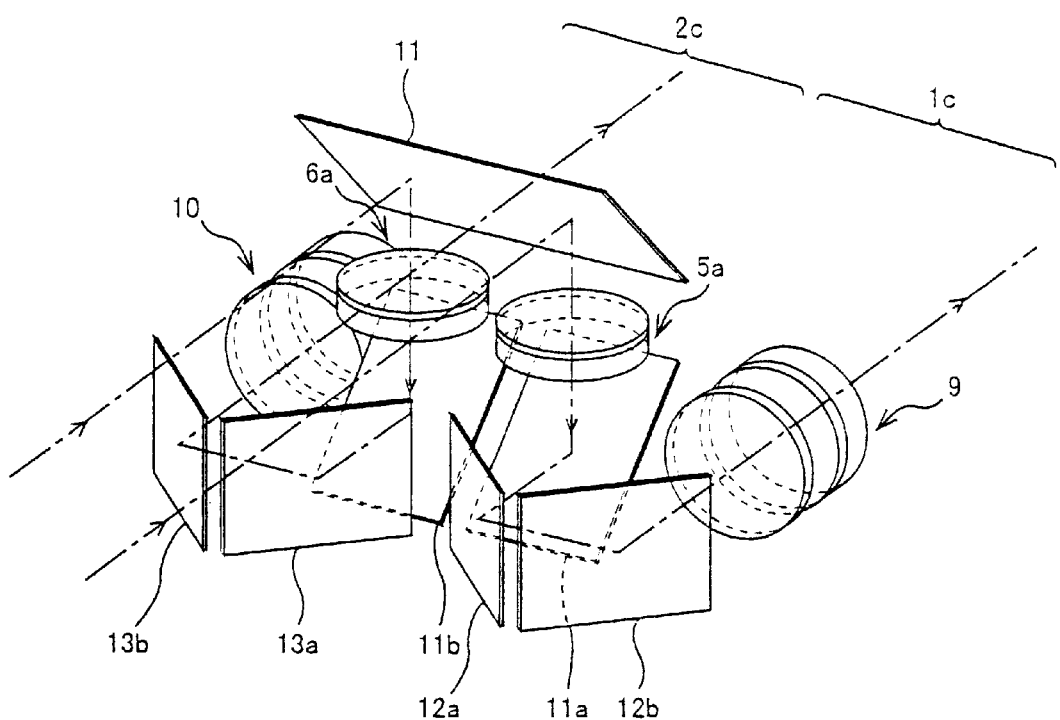
FIG. 8 is a perspective view of an optical system showing arrangement of optical elements of binoculars according to a fourth embodiment.
Figure 9:
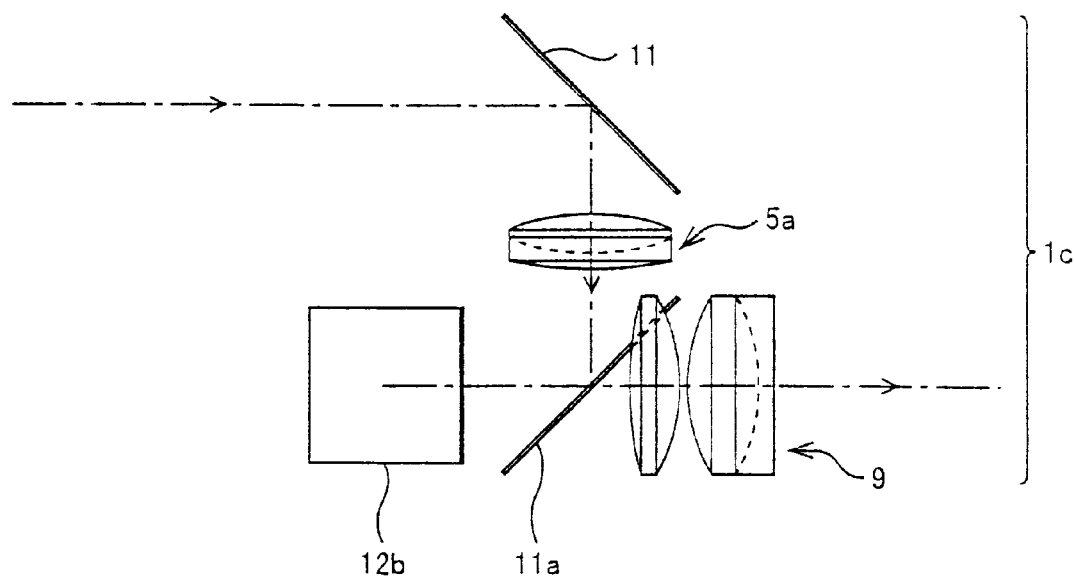
FIG. 9 is a side view of the optical system of FIG. 8 when a retractable mirror is in the working position.
Figure 10:
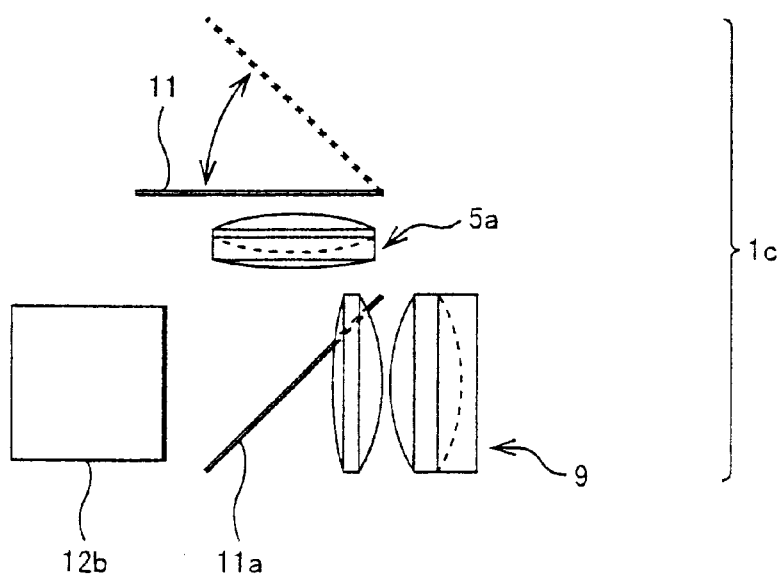
FIG. 10 is a side view of the optical system of FIG. 8 when a retractable mirror is in the retracted position.
Figure 11:
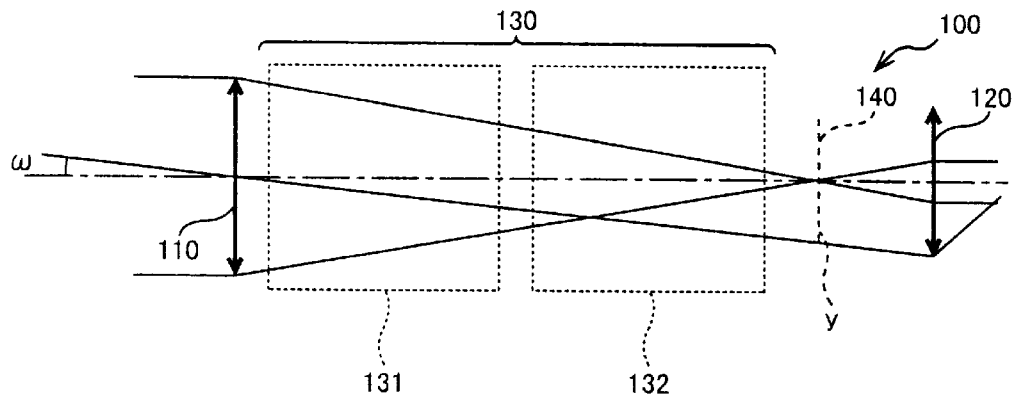
FIG. 11 is a developed diagram of an optical system of a conventional visual optical device.
Figure 12:
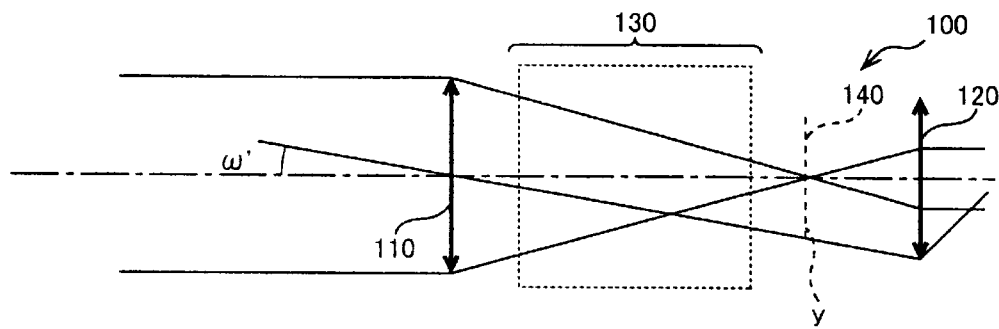
FIG. 12 is the developed diagram when a focal length of an objective lens becomes shorter.
Figure 13:
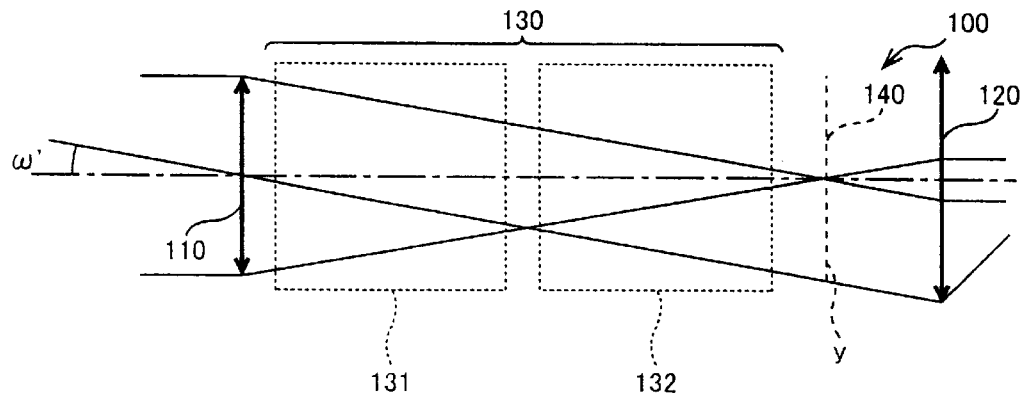
FIG. 13 is the developed diagram when a radius of aperture of a field stop becomes larger.

FIGS. 8 through 10 show binoculars according to a fourth embodiment. The difference of the fourth embodiment from the third embodiment is the position of the objective lenses 5a and 6a. The other constructions are common to the third embodiment.

The binoculars of the fourth embodiment has a pair of telescopes 1c and 2c that consist of objective lenses 5a, 6a, eyepieces 9, 10 and Porro type erecting systems that have a retractable mirror 11, a pair of second mirrors 11a, 11b, a pair of third mirrors 12a, 13a and a pair of fourth mirrors 12b, 13b. The objective lenses 5a and 6a are located between the retractable mirror 11 and the second mirrors 11a, 11b.

FIG. 9 is a side view of the binoculars of the fourth embodiment when the retractable mirror 11 is in the working position. When the retractable mirror 11 swings to the retracted position as shown in FIG. 10, the retractable mirror 11 is parallel to the horizontal plane.

Since the objective lenses 5a and 6a are located between the retractable mirror 11 and the second mirrors 11a, 11b, the optical system of the binoculars becomes thinner in the vertical direction when the retractable mirror 11 is in the retracted position. This is convenient to store the binoculars into a bag and/or to carry the binoculars.

The binoculars of the embodiments may be provided with an interpupillary adjusting mechanism that adjusts the interpupillary distance based on a distance between pupils of a user. In such a case, right and left telescopes are mounted on separate casings, respectively. The adjusting mechanism should be mounted between the casings to relatively slide the casings in the horizontal direction. Further, when the binoculars has the common retractable mirror, the width of the retractable mirror in the horizontal direction should be long enough to cover the necessary portion of the variable incident region that varies depending on the interpupillary distance.

The present disclosure relates to the subject matters contained in Japanese Patent Applications No. HEI 11-306447 and No. HEI 11-306448, filed on Oct. 28, 1999, which are expressly incorporated herein by reference in their entireties.

What is claimed is:

1. A telescope, comprising:
    an erecting system having first, second, third and fourth reflecting surfaces that are arranged from an object side, said first and second reflecting surfaces and said third and fourth reflecting surfaces facing each other at a right angle, respectively, wherein an intersection line between extended surfaces of said first and second reflecting surfaces is perpendicular to an intersection line between extended surfaces of said third and fourth reflecting surfaces;
    an objective lens that is located between said first and fourth reflecting surfaces, said objective lens having a positive refractive power to converge object light that is reflected by at least said first reflecting surface for forming an image; and
    an eyepiece that is located between said fourth reflecting surface and an eye point, said eyepiece having a positive refractive power to magnify said image formed by said objective lens,
    wherein said first reflecting surface is formed on a retractable mirror that can swing between a working position such that said first and second reflecting surfaces are perpendicular and a retracted position such that a free end of said retractable mirror moves close to said second reflecting surface.

2. The telescope according to claim 1, wherein said objective lens is located between said first and second reflecting surfaces.

3. The telescope according to claim 1, wherein said third and fourth reflecting surfaces comprise back-surfaces of a right-angle prism.

4. A binocular comprising:
    a pair of telescopes arranged side by side, each of said telescopes comprising:
    an erecting system having first, second, third and fourth reflecting surfaces that are arranged from an object side, said first and second reflecting surfaces and said third and fourth reflecting surfaces facing each other at a right angle, respectively;
    an objective lens that is located between said first and fourth reflecting surfaces, said objective lens having a positive refractive power to converge object light that is reflected by at least said first reflecting surfaces for forming an image; and
    an eyepiece that is located between said fourth reflecting surface and an eye point, said eyepiece having a positive refractive power to magnify said image formed by said objective lens,
    wherein said first reflecting surface can swing between a working position such that said first and second reflecting surfaces are perpendicular and a retracted position such that the free end of said retractable mirror moves close to said second reflecting surface.

5. The binoculars according to claim 4, wherein said objective lens is located between said first and second reflecting surfaces.

6. The binoculars according to claim 4, wherein said third and fourth reflecting surfaces of each of said erecting systems comprise back-surfaces of a right-angle prism.

7. The binoculars according to claim 4, wherein said second reflecting surfaces of said erecting systems are adjacent to each other in the same plane.

8. The binoculars according to claim 4, wherein said first reflecting surfaces of said erecting systems are formed on a common retractable mirror.

* * * * *